(12) United States Patent
Maddocks et al.

(10) Patent No.: US 12,156,499 B2
(45) Date of Patent: Dec. 3, 2024

(54) SYSTEM AND METHOD FOR ANIMATING A PLANT

(71) Applicant: Hello Tomorrow, LLC, Pawtucket, RI (US)

(72) Inventors: Richard J Maddocks, Barrington, RI (US); Leif J Askeland, Greenville, RI (US); Eduardo J Rodriguez, Tiverton, RI (US); Shelley M Smith, Plymouth, MA (US)

(73) Assignee: Hello Tomorrow, LLC, Pawtucket, RI (US)

( * ) Notice: Subject to any disclaimer, the term of this patent is extended or adjusted under 35 U.S.C. 154(b) by 196 days.

(21) Appl. No.: 17/886,545

(22) Filed: Aug. 12, 2022

(65) Prior Publication Data
US 2023/0301241 A1    Sep. 28, 2023

Related U.S. Application Data

(60) Provisional application No. 63/322,755, filed on Mar. 23, 2022.

(51) Int. Cl.
*A01G 9/02* (2018.01)

(52) U.S. Cl.
CPC ...................................... *A01G 9/02* (2013.01)

(58) Field of Classification Search
CPC ........ A01G 9/02; A01G 9/028; A01G 9/0295; A47G 7/04; A47G 7/041; A47G 2007/048
See application file for complete search history.

(56) References Cited

U.S. PATENT DOCUMENTS

| | | | |
|---|---|---|---|
| 1,336,307 A | 4/1920 | Loudon | |
| 1,396,445 A | 11/1921 | Loudon | |
| 1,609,246 A | 11/1926 | Hamburger | |
| 4,001,959 A | 1/1977 | Grendahl | |
| 4,227,343 A | 10/1980 | Espy et al. | |
| 6,128,854 A | 10/2000 | Chaney | |
| 6,594,951 B1 * | 7/2003 | Reynolds | A47G 7/041 47/39 |
| 8,132,359 B1 | 3/2012 | Hudak | |

(Continued)

FOREIGN PATENT DOCUMENTS

| | | |
|---|---|---|
| CN | 111684949 B | 4/2022 |
| WO | WO2021188788 A1 | 9/2021 |

OTHER PUBLICATIONS

Translation of KR_20140063220_A (Year: 2014).*

*Primary Examiner* — Monica L Perry
*Assistant Examiner* — Edgar Reyes
(74) *Attorney, Agent, or Firm* — Perry Hoffman (57) ABSTRACT

A device and method that support and animate a plant disposed in an inner plant pot having an underside including a pivoting magnet plate atop a waterproof interface relative to an outer plant pot lower housing. A follower magnet is mounted using a cam follower positioned below the waterproof interface for magnetic attraction with the pivoting magnet plate above. An electronic processor control module instantiates movement of the inner plant pot relative to the outer plant pot assembly via a single motor actuator, and a plurality of sensors in communication with the electronic processor control module collect data by the plurality of sensors upon the user touching the plant, among other inputs for interactive features, responses, gameplay, and the like.

20 Claims, 10 Drawing Sheets

(56) References Cited

U.S. PATENT DOCUMENTS

| | | |
|---|---|---|
| 8,166,701 B1 | 5/2012 | Duff, Sr. |
| 8,356,445 B1 * | 1/2013 | Colquhoun .............. A01G 9/02 47/65 |
| 10,966,550 B2 | 4/2021 | Maddocks et al. |
| 2005/0081439 A1 | 4/2005 | Lehman |
| 2017/0270817 A1 | 9/2017 | Kasravi et al. |
| 2019/0159413 A1 * | 5/2019 | Yaita ...................... A01G 24/00 |
| 2019/0208932 A1 | 7/2019 | Maddocks et al. |
| 2022/0104638 A1 | 4/2022 | Peng |

* cited by examiner

SYSTEM AND METHOD FOR ANIMATING A PLANT

PRIORITY CROSS-REFERENCE TO RELATED APPLICATION

This application claims priority pursuant to 35 U.S.C. 119(e) from U.S. Provisional patent application No. 63/322,755 filed on Mar. 23, 2022.

FIELD OF THE INVENTION

The present invention relates to human interaction with live or artificial plants. Particularly, this invention relates to detecting a human interaction with flowers or plants and triggering simulated responses from the live or artificial plants with simulated plant response.

BACKGROUND

Human interest in plant care dates to the earliest recorded times. The rationale for human interest in plants varies from the need to grow own food and herbs to the urge to create beauty and to satisfy an artistic interest. Because plants, whether live or artificial, do not speak, at least not in a language perceptible by humans, it is easy for humans to forget to feed and water or otherwise nurture live plants in a way one would with pets. Growing strong healthy plants takes a certain amount of commitment. A need exists for a motorized yet waterproof electronic processor control that instantiates patent pot movements, with sensors in communication to collect data upon user interactions plants, including inputs for interactive features, and responses. The present invention is directed toward providing such methods, devices and systems.

SUMMARY OF THE INVENTION

The methods and systems of the present invention provides an inner plant pot placed in a cooperative relationship with an outer pot. The inner pot interacts to enable the plant and pot assembly to move longitude (or nod/tilt forward and back) as well as rotating side to side.

The present invention advances the art of plant nurturing for human interaction with plants. An electronic processor control module instantiates movement of the inner plant pot relative to the outer plant pot assembly via a waterproof interface with magnetic attraction with rotational, tilt and pivot magnet interactions, and a plurality of sensors in communication with the electronic processor control module collect data by the plurality of sensors upon the user touching the plant, among other inputs for interactive features, responses, gameplay, and the like.

Briefly summarized, the present inventions relate to supporting and animating a plant disposed in an inner plant pot having an underside including a pivoting magnet plate atop a waterproof interface relative to an outer plant pot lower housing. A follower magnet is mounted using a cam follower positioned below the waterproof interface for magnetic attraction with the pivoting magnet plate above. An electronic processor control module instantiates movement of the inner plant pot relative to the outer plant pot assembly via a single motor actuator. A waterproof lower housing is provided by means of magnetic couplings to protect the electronic components, sensors, speaker, motor, power supply battery box 33 from water intrusion during watering of the plant, to prevent water entering the lower housing causing a malfunction and permanent damage in the event of a user overfilling the inner pot during the normal course of plant maintenance. The design also facilitates ease of removal of inner pot for cleaning by simply lifting out of outer pot by breaking the magnetic attraction. The functionality and benefits provided by the present invention will be apparent to those skilled in the art from the description that follows.

DETAILED DESCRIPTION OF THE EMBODIMENTS

The present invention is generally directed to a device and method that support and animate a plant disposed in an inner plant pot having an underside including a pivoting magnet plate atop a waterproof interface relative to an outer plant pot lower housing. A follower magnet is mounted using a cam follower positioned below the waterproof interface for magnetic attraction with the pivoting magnet plate above.

An electronic processor control module instantiates movement of the inner plant pot relative to the outer plant pot assembly via a single motor actuator, and a plurality of sensors in communication with the electronic processor control module collect data by the plurality of sensors upon the user touching the plant, among other inputs for interactive features, responses, gameplay, and the like. To this end, applicants U.S. patent No. 10,966,550, and WO 2021/188788 A1 for System and Method for Animating a Plant disclosures are hereby incorporated by reference in their entirety herein.

FIGS. 1 through 15, exemplary embodiments of improved operation for animating a plant with an inner plant pot having an underside including a pivoting magnet plate atop a waterproof interface relative to an outer plant pot lower housing. A follower magnet is mounted using a cam follower positioned below the waterproof interface for magnetic attraction with the pivoting magnet plate above. An electronic processor control module instantiates movement of the inner plant pot relative to the outer plant pot assembly via a single motor actuator. A waterproof lower housing is provided by means of magnetic couplings to protect the electronic components, sensors, speaker, motor, batteries and power supply from water intrusion during the normal course of plant maintenance. This design also allows a standard round nursery plant pot obtained from point of purchase, containing a plant, to be inserted into the inner pot without having to re-plant.

Figures 1, 2:
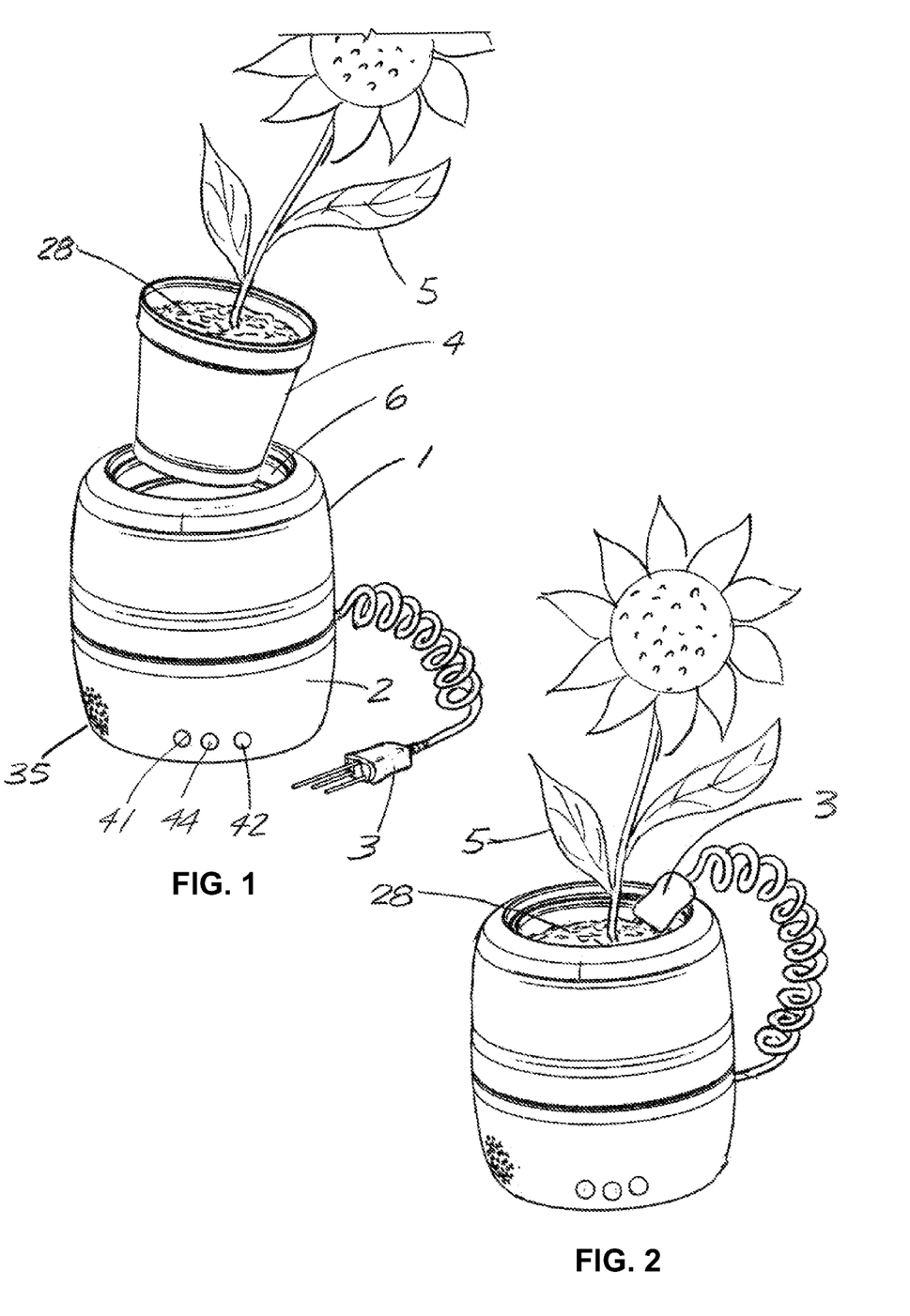
FIGS. 1 and 2 are illustrative perspective views showing elements of the present invention embodied as a standard round nursery plant pot 4 containing a plant rooted in potting soil purchased from point of sale about to be inserted into the inner pot with probe for monitoring the moisture level inserted into the potting soil.

The described embodiment allows for easy removal of inner pot 6 for cleaning by simply lifting out of outer pot upper 1 by breaking the magnetic attraction. Referenced structures include:

1 outer pot upper
2 outer pot lower
3 probe
4 standard round nursery plant pot
5 plant
6 inner pot
7 waterproof interface
8 outer pot upper drain
9 drain path
10 drain exit
11 pivoting magnet plate
12 magnet (×2)
13 dual purpose shaft 13 (inner pot 6 tilt axis/rollers 14 location)
14 roller (×2)
15 inner pot tilt bearing
16 magnet (×2)
17 tilt cam follower
18 tilt cam follower peg
19 double sided cam
20 tilt cam profile
21 tilt actuation arrow
22 turntable shaft
23 tilt cam follower 17 moves to position 23
24 swinging magnet mount moves to position 24
25 X ° tilt
26 turntable
27 turntable 26 rotation arrow
27(a) turntable 26 rotating clockwise
27(b) turntable 26 rotating counter-clockwise
28 potting soil
30 motor/reduction gearing/cam sub-assembly
31 motor module
32 output drive gear from motor/reduction gearing
33 battery box
34 sensor array
35 speaker
36 electronic processor control module
37 bluetooth module
38 turn cam profile
39 turn follower
40 turn follower peg
41 CDS photoresistor light sensor
42 microphone
43 inner pot 6 bi-directional rotation
43(a) inner pot 6 rotating clockwise
43(b) inner pot 6 rotating counter-clockwise
44 message button
45 turn gear
46 sector
47 sector
48 upright position
49 tilt back position
50 upright position
51 turned right position
52 turned left position
53 facing forward at position 'B'
54 facing forward at position 'A'
55 turntable 26 in facing forward position
56 turntable 26 in turned right position
57 turntable 26 in facing left position
58 turn follower direction of movement
59 square socket connector in turntable 26
60 square connector on turntable shaft 22
80 play message (stored in flash memory)
82 check inputs
84 execute response FIGS. 1 and 2 show a standard round nursery plant pot 4 containing a plant 5 rooted in potting soil 28 purchased from point of sale about to be inserted into the inner pot 6 with probe 3 for monitoring the moisture level inserted into the potting soil 28. An outer plant pot assembly includes an outer pot upper housing 1 and an outer pot lower housing 2, the outer pot upper housing 1 defines a first outer plant pot interior volume and a waterproof interface 7, the outer pot lower housing 2 defines a second outer plant pot interior volume.

Figure 3:
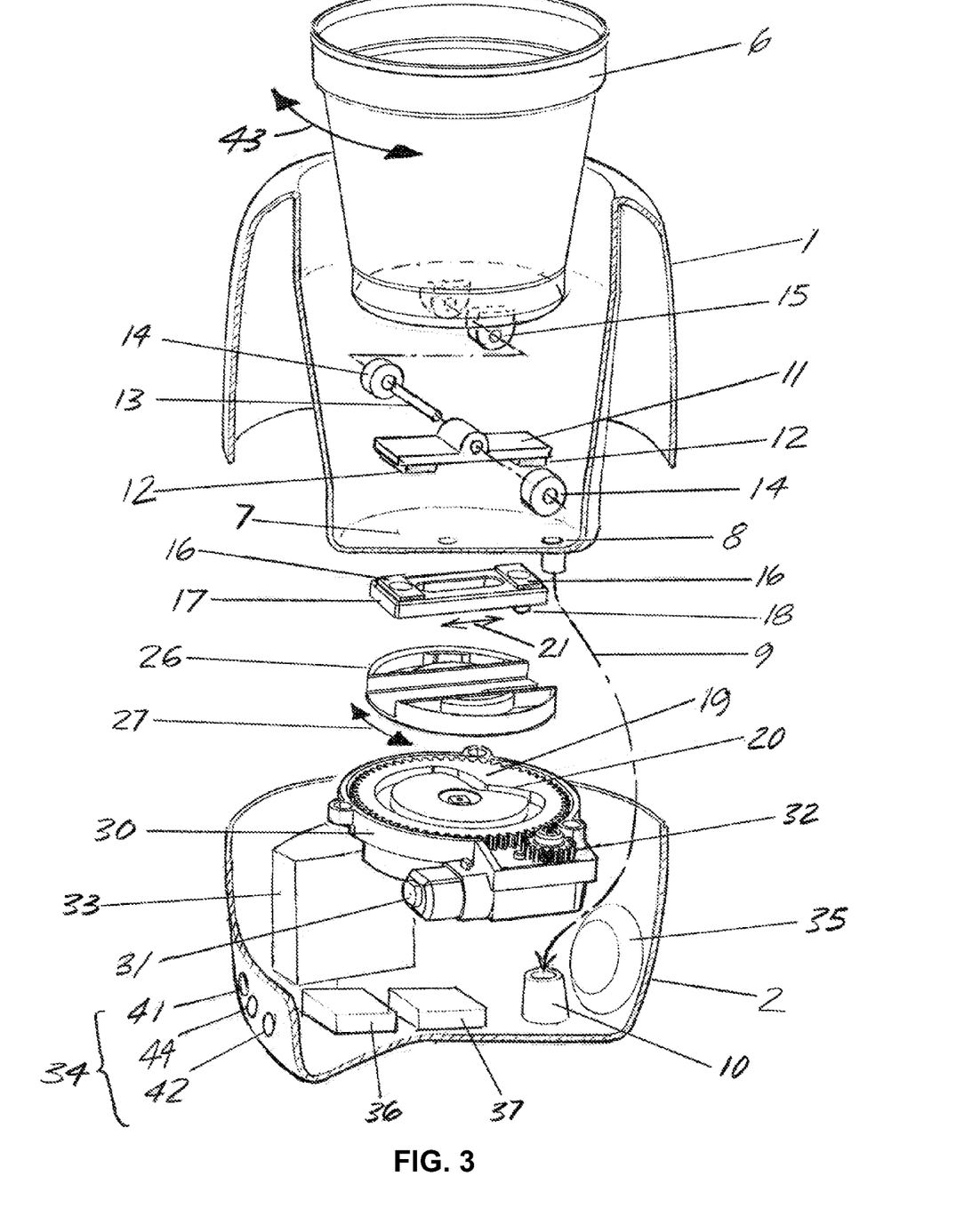
FIG. 3 is an exploded perspective view with part section through the upper and lower pots showing a rotating turntable disposed between a follower magnet and cam mechanism for transmitting bi-directional movements using magnetic attraction with the pivoting magnet plate for inner plant pot movements relative to the outer plant pot assembly, which causes a resulting animation by the cam follower mechanism through the waterproof interface.
Figure 4:
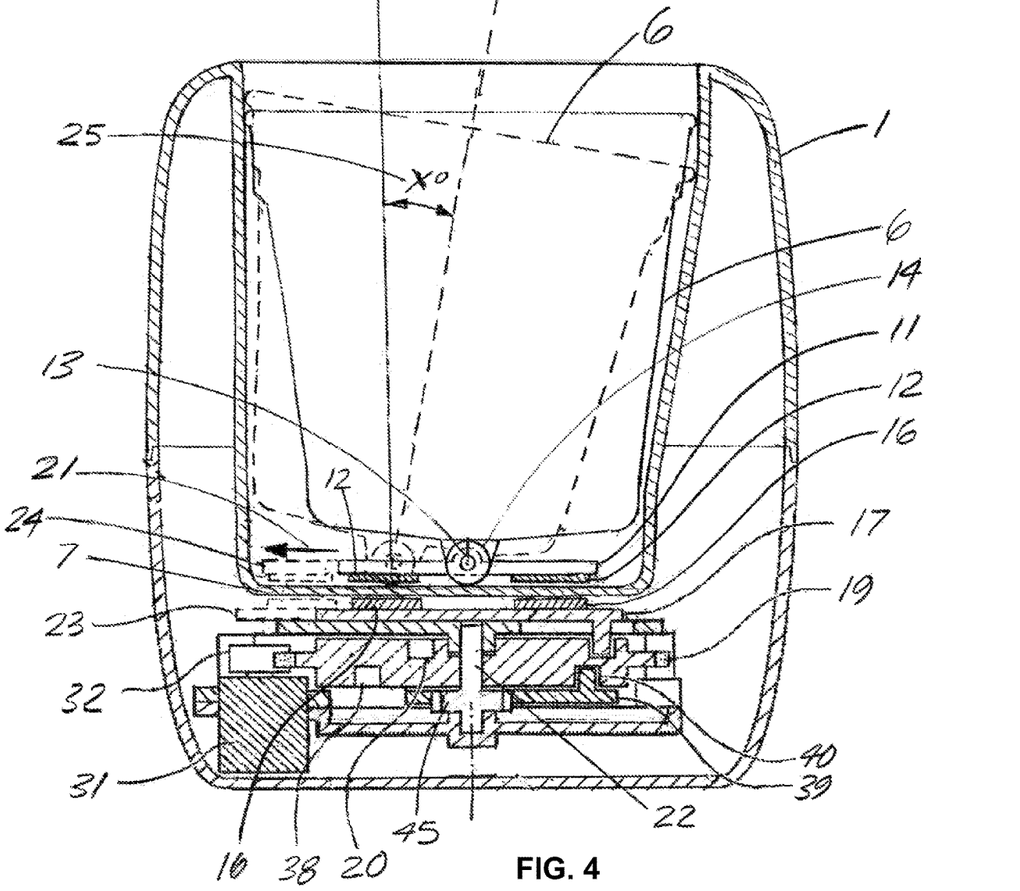
FIG. 4 is a sectional view through the plant pot assembly illustrating the tilt actuation with the drive mechanism, magnetic coupling and waterproof interface assembly.
Figure 5:
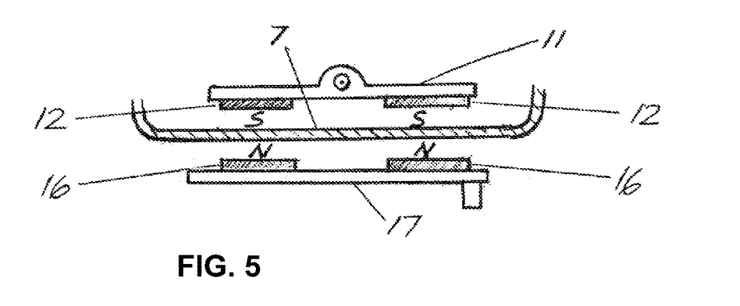
FIG. 5 shows magnetic coupling with magnet orientation indicated by south pole 'S' and north pole 'N' aligned to transmit tilt and turn motion through the waterproof interface.
Figures 6, 7:
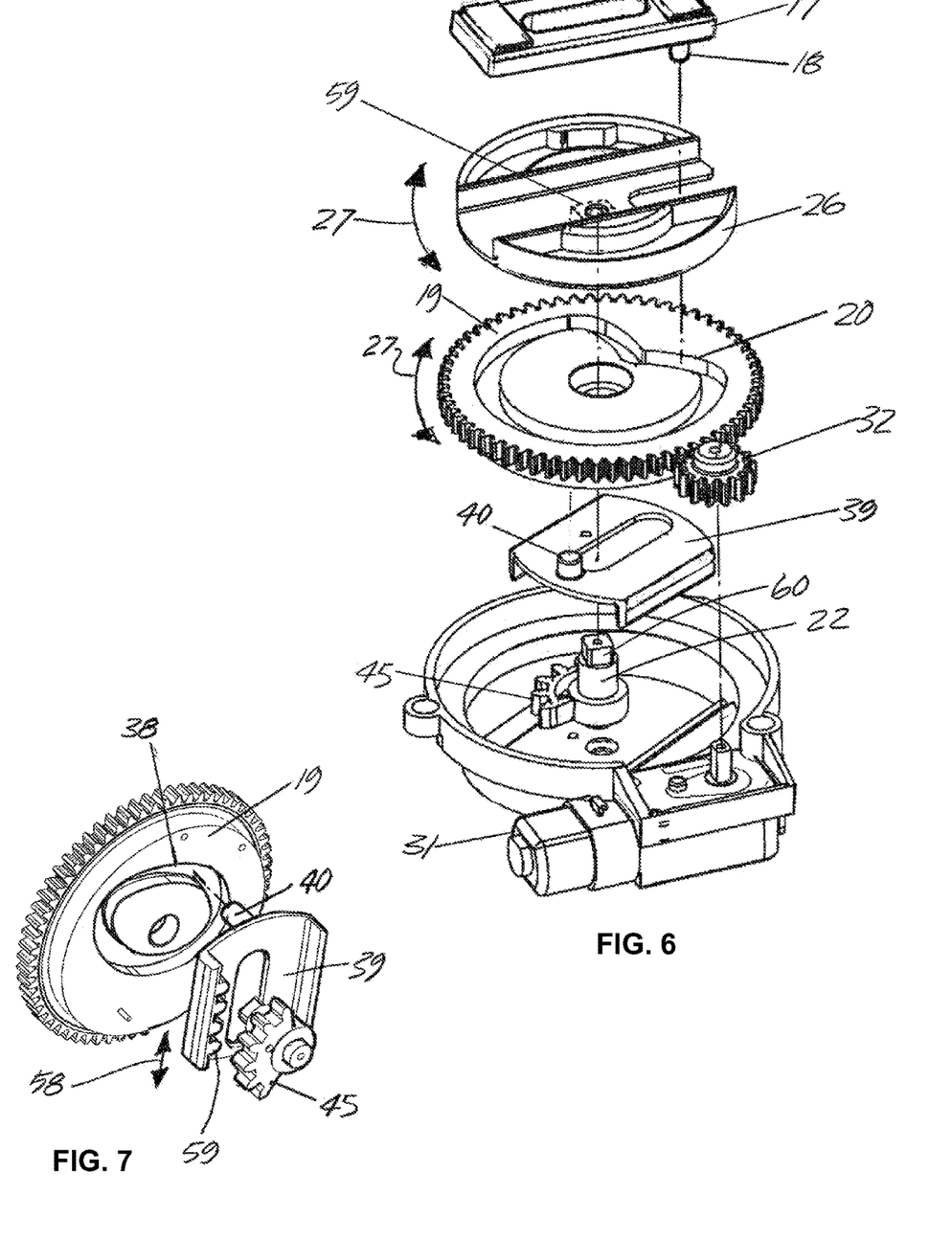
FIG. 6 is an exploded view double sided cam assembly showing Tilt Cam and linkage.
FIG. 7 is a part underside view through the dual or double-sided cam showing the Turn Cam and Linkage relationship between the turn and tilt followers with the respective cam tracks.
Figure 8:
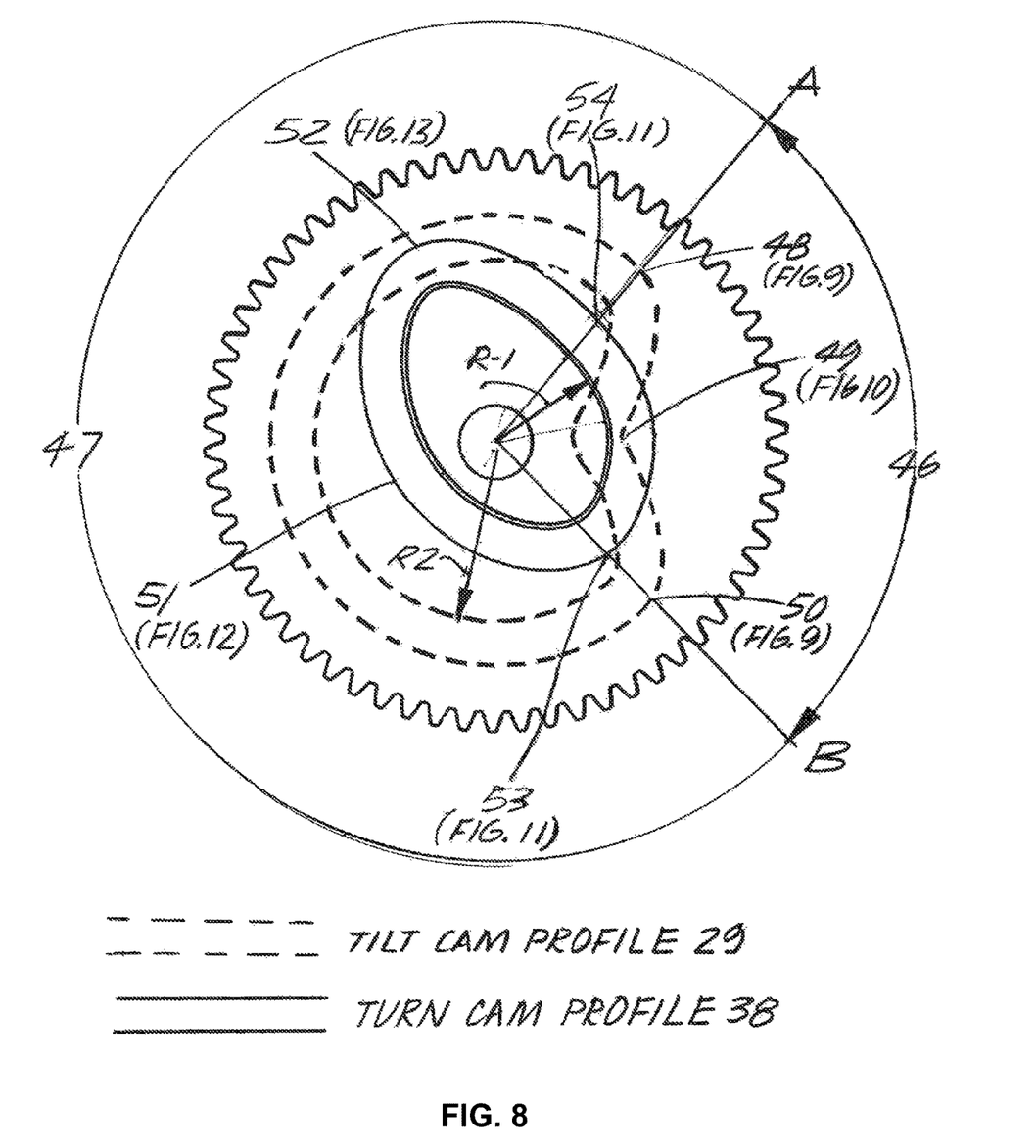
FIG. 8 is a described double-sided cam illustrating its tilt and turn cam profiles superimposed to enable the independent turn and tilt actuation.

A cam mechanism (double sided cam 19) and cam follower (tilt cam follower 17/tilt cam follower peg 18) are disposed within the second outer plant pot interior volume, the cam mechanism actuated with a motor module 31 and motor/reduction gearing/cam sub-assembly 30. FIG. 3 is an exploded perspective view with part section through the upper and lower pots showing a rotating turntable 26 is disposed between follower magnet and the cam mechanism with a turntable shaft 22 connected therethrough with the motor actuator for transmitting bi-directional movements using the cam follower 17 and follower magnet magnetic attraction with the pivoting magnet plate 11 for inner plant pot movements relative to the outer plant pot assembly, which causes a resulting animation by the cam follower mechanism through the waterproof interface, with part section through the upper and lower pots showing the magnetic clutch and waterproof interface. FIG. 4 is a sectional view through the plant pot assembly illustrating the tilt actuation with the drive mechanism, magnetic coupling and waterproof interface assembly. In FIG. 5 magnetic coupling via magnet orientation indicated by south pole 'S' and north pole 'N' is aligned to transmit tilt and turn motion through the waterproof interface. Referring to FIG. 1 a standard round nursery plant pot 4 containing a plant 5 rooted in potting soil 28 purchased from point of sale about to be inserted into the inner pot 6. Referring to FIG. 3 the drain path 9 connects outer pot drain 8 to drain exit 10 allowing any excess water to drain out through the drain exit 10 in waterproof interface 7. The FIG. 6 Exploded view illustrates the double-sided cam assembly showing Tilt Cam and linkage, and FIG. 7 is a part underside view through the dual or double-sided cam 19 showing the Turn Cam and Linkage relationship between the turn and tilt followers with the respective cam tracks. As described FIG. 8 illustrates the double-sided cam having its tilt and turn cam profiles superimposed to enable the independent turn and tilt actuation.

Figures 9, 10:
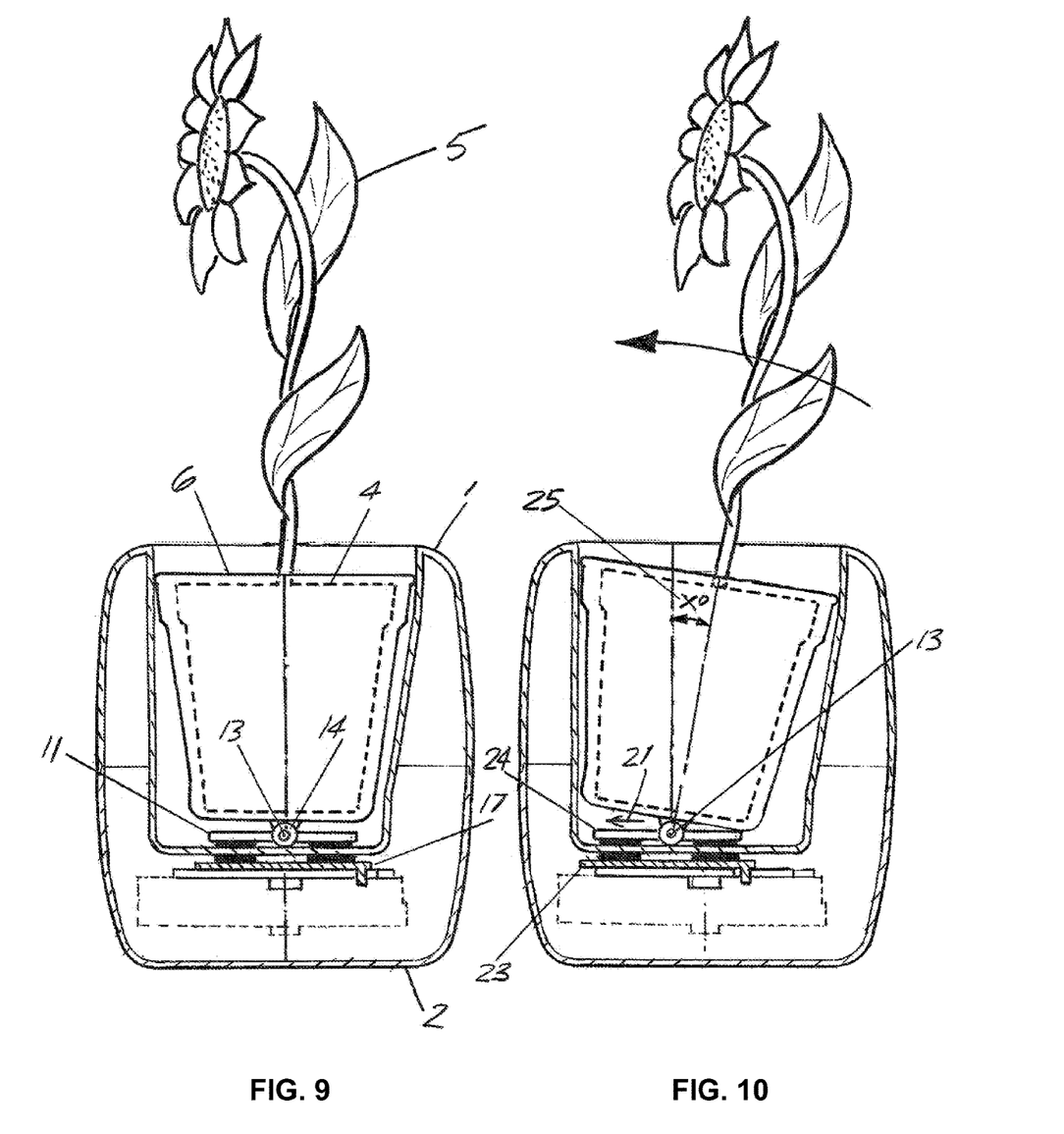
FIGS. 9 and 10 are side views of a described embodiment with the tilt mechanism showing plant in FIG. 9 in its upright position, then in a leaning back position in FIG. 10 for upright, forward and back responses with the plant in tilting positions through possible cam profile configurations.
Figure 11:
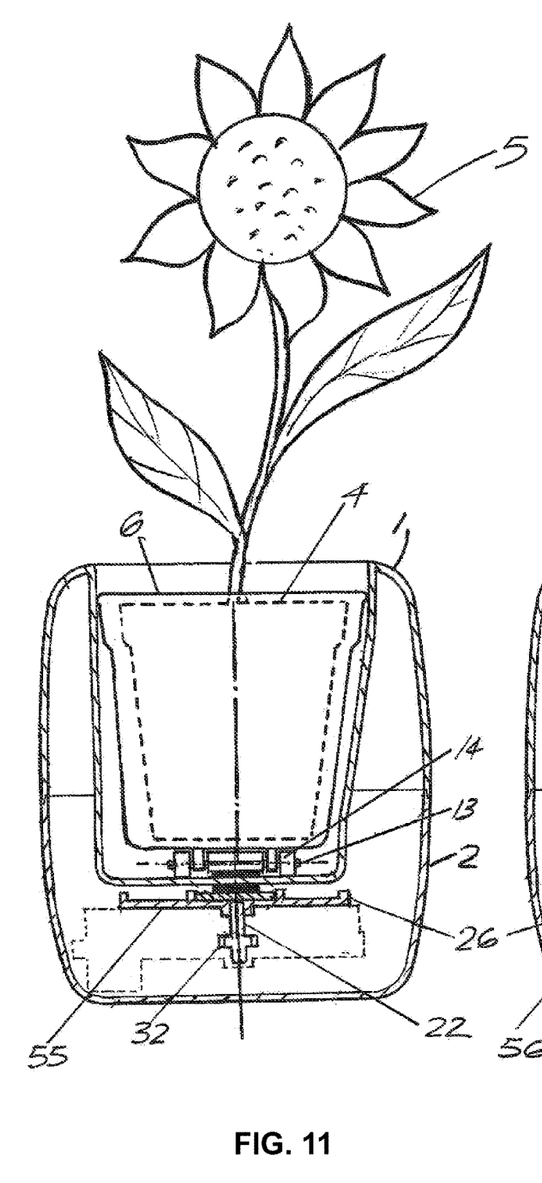
FIGS. 11, 12 and 13 are plant 5 front views of the present described embodiment with the turntable rotating from its center facing forward or neutral position, then right with turntable shown rotated to turned right position, and left with turntable shown rotated to turned left position respectively.
Figure 12:
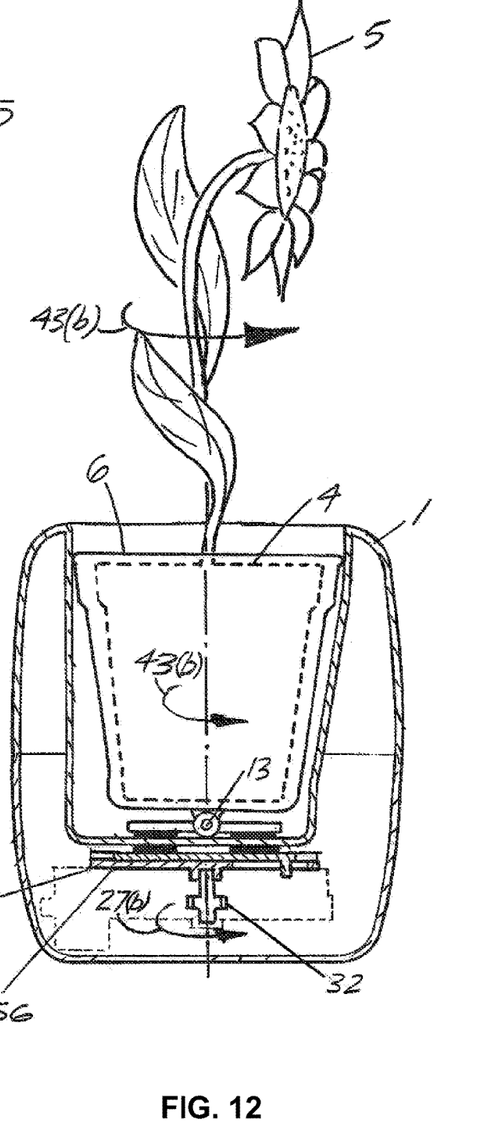
Figure 13:
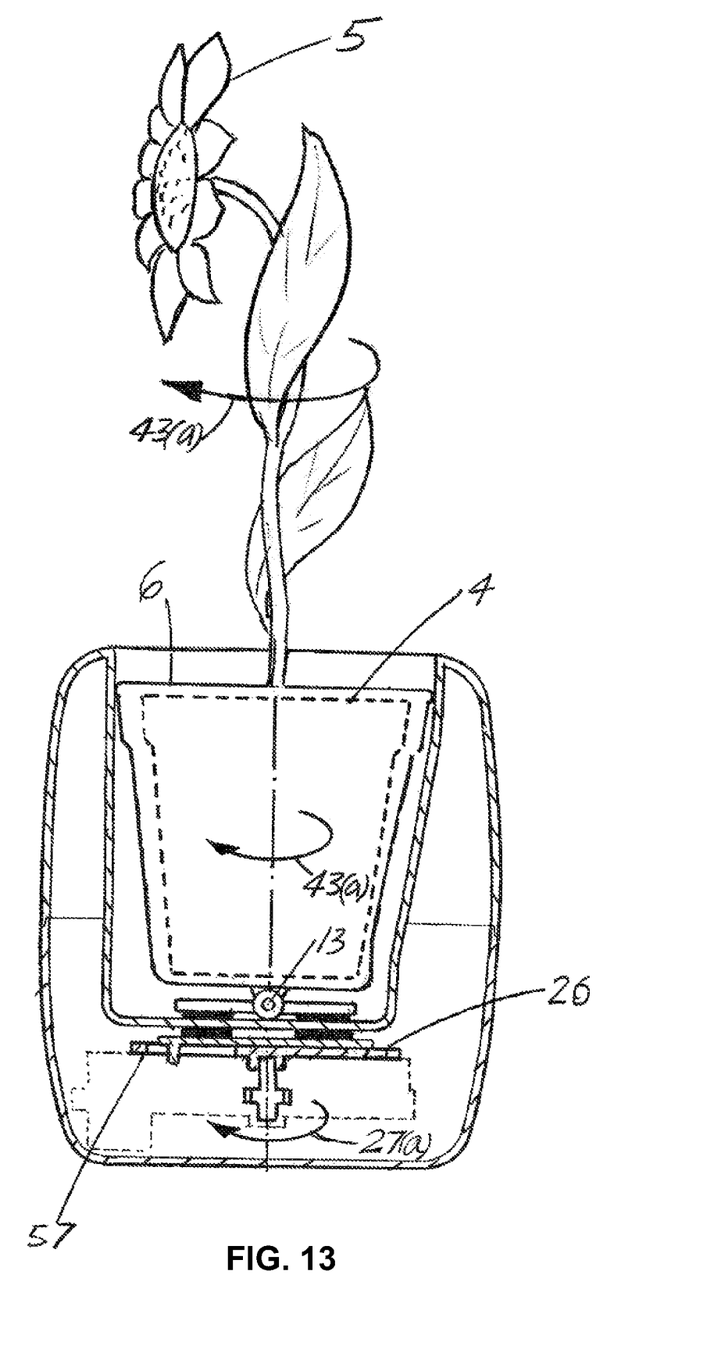

FIGS. 9 and 10 are side views of a described embodiment with the tilt mechanism showing plant 5 in FIG. 9 in its upright position, then in a leaning back position in FIG. 10 for upright, forward and back responses with the plant in tilting positions through possible cam profile configurations. FIGS. 11, 12 and 13 are plant 5 front views of the present described embodiment with the turntable 26 rotating from its center facing forward or neutral position 55, then right with turntable 26 shown rotated to turned right position 56 and left with turntable 26 shown rotated to turned left position 57 respectively. As described further below, FIG. 14 depicts an illustrative example of the hardware architecture utilized, and FIG. 15 provides an illustrative flow chart for operations in accordance with the present invention.

Figure 15:
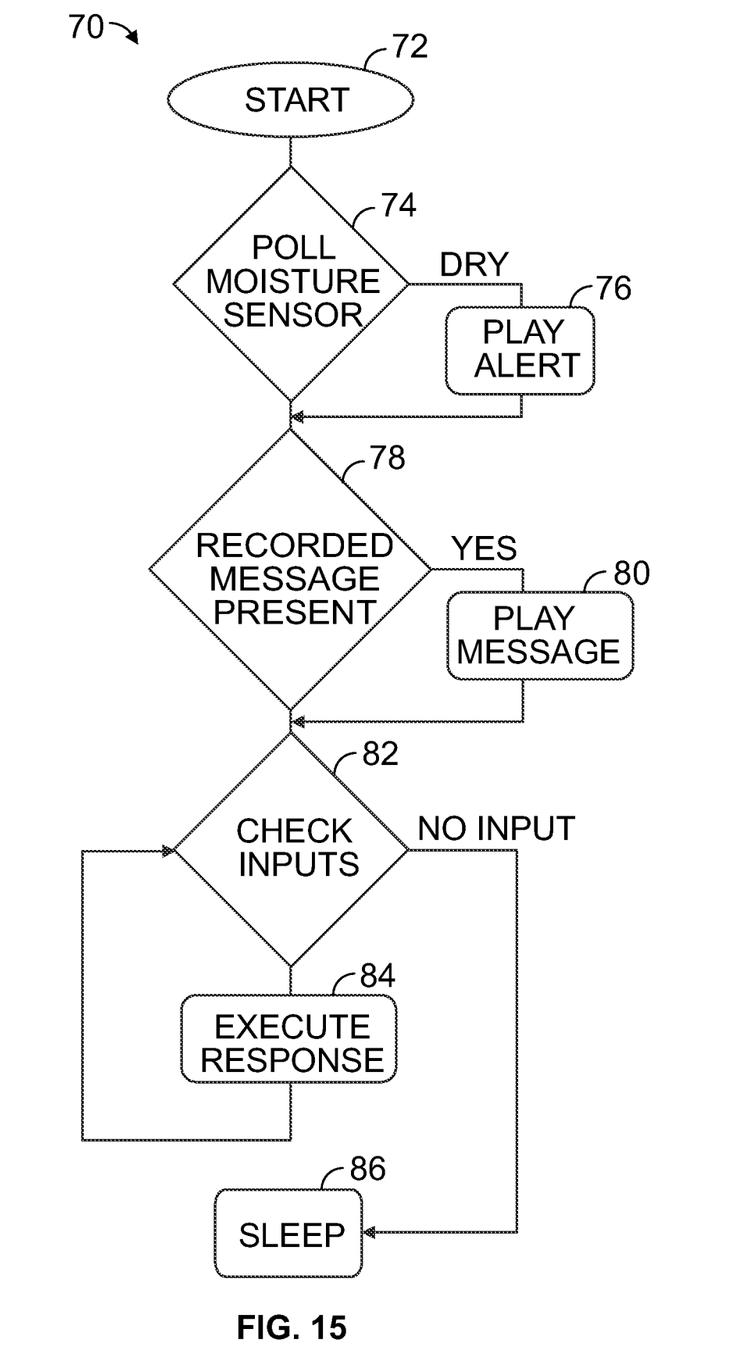
FIG. 15 is an illustrative flow chart for operations in accordance with the present invention.

Referring again to FIG. 2 the probe 3 is inserted into the potting soil 28 to enable connectivity completing the circuit indicated in FIG. 15 to enable human interaction with the plant by touch. Also, to measure the moisture level in the potting soil 28 alerting the user with audio message 80 to add water if the potting soil is too dry.

When power is switched on at start 72 the Electronic Processor Module 36 will continuously check for inputs from sensor array 34, and Check Inputs 82 described:
1. Measure moisture content in potting soil 28 enabled with connection to probe 3
2. Proximity detection from CDS light sensor 41
3. Human touch on plant 5 detected by capacitive sensing enabled through connection to probe 3 in potting soil 28
4. Audio input (voice or music) from microphone 42
5. Bluetooth module 37 pairing from smartphone.

Figure 14:
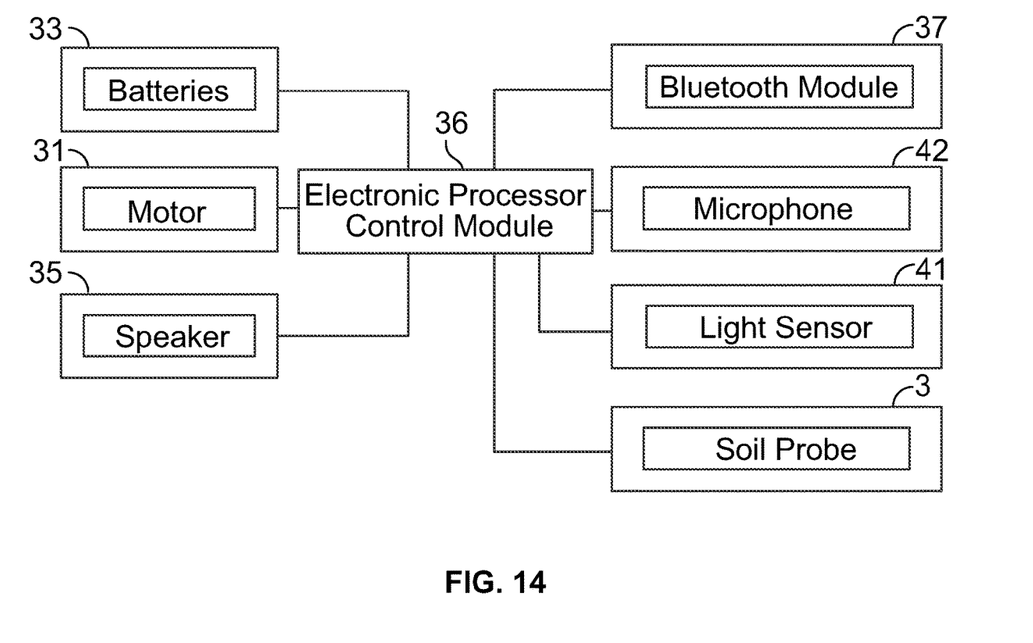
FIG. 14 depicts an illustrative example of the hardware architecture utilized in accordance with the present invention.

Referring to FIGS. 14, 15, corresponding Execute Response 84:
1. Play audio alert warning that potting soil 28 is dry and water is required
2. Enabled by animated inner pot 6 the plant 5 will respond with preprogrammed movement routines such as greeting gesture with sound effects.
3. Enabled by animated inner pot 6 the plant 5 will respond with preprogrammed movement routines such as demonstrating affection with sound effects.
4. Enabled by animated inner pot 6 the plant 5 will react with preprogrammed movement routines such as synchronized dancing to music or responding to conversation.
5. All audio content (voice and music) from the paired smartphone will be played back through the speaker 35 in outer pot 2, accompanied with synchronized dance moves by the plant 5 enabled by animated inner pot 6.

Referring to FIGS. 1, 14, 15 the audio message 80 is stored in flash memory in the Electronic Processor Module 36. The user records a customized personal message 78 by pressing and holding the message button 44 while speaking onto microphone 42.

(Check Inputs 82)—On the first touch the of the plant 5 or by pressing and releasing the message button 44 the audio message is played back by the recipient (Execute response 84). Such sensors and response are not limited to these examples.

Referring to FIGS. 3, 4 and 5, magnets 12 and 16 are mounted in the respective assemblies such that they attract through the waterproof interface 7 thereby transmitting the turn and tilt motion to the inner pot 6. To enable the described attraction, referring to FIG. 5 magnets 16 are mounted with north pole (N) face up in tilt cam follower 17. Magnets 12 mounted with south pole (S) face down in pivoting magnet plate 11.

As shown, the FIG. 3 rollers 14 are mounted on dual purpose shaft 13 enable the pivoting magnet plate 11 to maintain close parallel contact with the waterproof interface 7 to maximize the magnetic attraction. Additionally rollers 14 provide a low friction bearing support for the inner pot 6 as it pivots through X ° tilt 25 and rotates in direction of arrow 43 when actuated by rotation of turntable 26 as indicated by arrow 27. Referring to FIG. 3, the single motor module 31 with the output drive gear 32 engages with gear teeth on the periphery of double sided cam 19 to drive the cam 19 clockwise or counterclockwise, controlled by the electronic processor control module 36.

Referring to FIGS. 4 and 5 when the tilt cam follower 17 moves to position 23 magnets 16 attract magnets 12 moving the pivoting magnet plate 11 to position 24 as indicated by tilt actuation arrow 21 causing the inner pot 6 to tilt through X ° tilt rotation 25. Referring to FIG. 6 and FIG. 7 the motor module 21 bi-directionally drives gear 32 meshing with peripheral gear on double sided cam 19. Referring to FIG. 7 the turn cam profile 38 located on underside of double sided cam 19. The peg 40 on turn cam follower 39 engages with the turn cam profile 38 to actuate the bi-directional movement of turn follower 39 indicated by arrow 58. The integral gear rack 59 meshes with gear 45 on turntable shaft 22.

Bi-directional rotational movement is transmitted through turntable shaft 22 rigidly connected to rotating turntable 26 by square plug 60 and socket 59 as indicated by rotation arrow 27, also indicated in FIGS. 12 and 13.

FIG. 12 demonstrates turntable 26 direction of rotation counter-clockwise 27(b), the rotation 43(b) transmitted to inner pot 6 by means of magnetic coupling (FIG. 5) resulting in plant 5 turned right position (FIG. 12).

FIG. 13 demonstrates turntable 26 direction of rotation clockwise 27(a), the rotation 43(a) transmitted to inner pot 6 by means of magnetic coupling (FIG. 5) resulting in plant 5 turned left position (FIG. 13)

With reference to FIGS. 6, 7 and 8 the tilt cam follower 39 and turn cam follower 39 are controlled by the cam profiles shown schematically superimposed in FIG. 8, where tilt cam profile 20 (chain dot outline) and turn cam profile 38 (solid line outline).

As an example of the double sided cam 19 providing means for inner pot animation, referring to FIG. 8 independent tilt animation is achieved when tilt cam follower pin 18 and turn cam follower pin 40 are guided clockwise in their corresponding cam profiles in sector 46 from angular position A to B: The turn cam profile 38 is in dwell at a constant radius R-1 in sector 46 thereby the turn follower 39 is stationary while the tilt cam profile 29 is tracing a constantly decreasing radius from position 48 (upright, ref FIG. 9) to position 49 (leaning back, ref FIG. 10) and continuing to follow clockwise a constantly increasing radius to position 50 (upright, ref FIG. 9).

A "nodding gesture or bowing" animation is achieved by rotating cam profile 29 counterclockwise from position 49 (FIG. 10) to position 48 (FIG. 9), then reversing motor to rotate cam profile 29 back to position 49 (FIG. 10). The resulting animation is a tilt forward and back as shown in FIGS. 9 and 10. As a further example of the double sided cam 19 providing means for inner pot animation, referring to FIGS. 6, 7 and 8 an independent turn animation is achieved when turn cam follower pin 40 and tilt cam follower pin 18 are guided clockwise in sector 47 in their corresponding cam profiles beginning at angular position B: The tilt cam profile 29 is in dwell at a constant radius R-2 in sector 47 thereby the tilt follower 17 is stationary while the turn cam profile 38 is tracing a constantly decreasing radius from position 53 (facing forward ref FIG. 11) to position 51 (turned right position, ref FIG. 12). Continuing clockwise, the turn cam profile 38 moves the turn follower 39 in direction of arrow 58 to position 52 on cam (turned left position FIG. 13). To continue clockwise a constantly increasing radius to position 54 returns the inner pot 6 to facing forward position in FIG. 11.

Referring to FIGS. 14-15 respective block diagram/flow chart use capacitive sensing ability of the leaves wakes up the computer chip to unlock a preprogrammed sequence of animated routines including but not limited to the speed of stroking and touching, unlocking a musical sequence, initiating dance like movements, etc. In accordance with aspects of the invention, the plant leaf can serve as the capacitance sensor, such that when a person touches a leaf a circuit is completed with conductivity via a remote soil probe 3 that is placed in the soil. Talking to the plant will also initiate a response by input to a microphone, as will playing music or clapping hands when the plant will simulate dance moves in response to the incoming sounds.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. As utilized herein, the terms "comprises" and "comprising" are intended to be construed as being inclusive, not exclusive. The use of "substantially" is equally applicable when utilized in a negative connotation to refer to the complete or near complete lack of an action, characteristic, property, state, structure, item, or result, as would be appreciated by one of skill in the art. As utilized herein, the terms "about", "generally", and "approximately" are intended to cover variations. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

What is claimed is:

1. A device for supporting and animating flowers or plants, comprising:
    an outer plant pot assembly comprising an outer pot upper housing and an outer pot lower housing, the outer pot upper housing defining a first outer plant pot interior volume and a waterproof interface, the outer pot lower housing defining a second outer plant pot interior volume with the waterproof interface disposed between the first outer plant pot interior volume and the second outer plant pot interior volume;
    an inner plant pot having an inner plant pot interior volume configured to house a plant therein with the inner plant pot received within the first outer plant pot interior volume, the inner plant pot having an underside thereof coupled with a pivoting magnet plate at the waterproof interface for inner plant pot displacement movements relative to the first outer plant pot interior volume and the waterproof interface, the outer pot lower housing defining a second outer plant pot interior volume;
    a single motor actuator within the second outer plant pot interior volume;
    a cam mechanism and cam follower disposed within the second outer plant pot interior volume, the cam mechanism actuated with the motor; and
    a follower magnet mounted on the cam follower, the follower magnet being positioned below the pivoting magnet plate at the waterproof interface for magnetic attraction therebetween, with the follower magnet responsive to the cam follower from within the second outer plant pot interior volume such that the inner plant pot moves relative to the outer plant pot assembly.

2. The device of claim 1, wherein the motor actuator and the cam mechanism are mounted mechanically together within the second outer plant pot interior volume to move therein.

3. The device of claim 2, comprising a rotating turntable disposed between follower magnet and the cam mechanism with a turntable shaft connected therethrough with the motor actuator for transmitting bi-directional movements using the cam follower and follower magnet magnetic attraction with the pivoting magnet plate for inner plant pot movements relative to the outer plant pot assembly, which causes a resulting animation of the inner plant pot.

4. The device of claim 3, wherein the follower magnet, comprises a magnetic coupling with south pole and north pole magnet orientation with the pivoting magnet plate for tilt and turn inner plant pot movements of the inner plant pot relative to the outer plant pot using the cam follower.

5. The device of claim 1, wherein the motor actuator controls and instantiates vertical longitudinal movement of the inner plant pot relative to the outer plant pot assembly.

6. The device of claim 1, wherein the motor actuator controls and instantiates rotational movement of the inner plant pot relative to the outer plant pot assembly.

7. The device of claim 1, further comprising an electronic processor control module that instantiates movement of the inner plant pot relative to the outer plant pot assembly with the motor actuator.

8. The device of claim 7, further comprising a plurality of sensors in communication with the electronic processor control module providing data collected by the plurality of sensors.

9. The device of claim 8, wherein the plurality of sensors comprise one or more of a capacitance sensor, an audio sensor, an optical sensor, a vibrational sensor, a moisture sensor, a temperature sensor, a magnetic sensor, a chemical sensor, a motion sensor, an infrared sensor, and a wireless electromagnetic signal sensor.

10. The device of claim 8, wherein at least one of the plurality of sensors comprises a capacitance sensor.

11. The device of claim 10, wherein the plurality of sensors comprise a soil probe, the capacitance sensor comprises a leaf of a plant, and a conductive circuit is completed when a user touches the leaf and the conductivity circuit is completed via the soil probe, which provides capacitance data that changes upon the user touching the plant.

12. The device of claim 7, further comprising a soil probe disposed within the inner pot interior volume, the soil probe enabling electronic communication between the electronic processor control module and a plurality of sensors, wherein an electronic processor controller comprises a means to communicate with smart devices using electromagnetic waves.

13. A method for supporting and animating flowers or plants, comprising:
   providing an outer plant pot assembly with an outer pot upper housing and an outer pot lower housing;
   defining a first outer plant pot interior volume in the outer pot upper housing;
   defining a second outer plant pot interior volume in the outer pot lower housing;
   providing a waterproof interface disposed between the first outer plant pot interior volume and the second outer plant pot interior volume;
   providing an inner plant pot having an inner plant pot interior volume configured to house a plant therein with the inner plant pot received within the first outer plant pot interior volume;
   coupling an underside of the inner plant pot with a pivoting magnet plate at the waterproof interface for inner plant pot displacement movements relative to the first outer plant pot interior volume at the waterproof interface above the second outer plant pot interior volume of the outer pot lower housing;
   positioning a single motor actuator within the second outer plant pot interior volume;
   driving a cam mechanism and cam follower within the second outer plant pot interior volume, the cam mechanism being actuated with the motor; and
   mounting a follower magnet on the cam follower, the follower magnet being positioned below the waterproof interface relative to the pivoting magnet plate for magnetic attraction therebetween, with the follower magnet responsive to the cam follower from within the second outer plant pot interior volume such that the inner plant pot moves relative to the outer plant pot assembly.

14. The method of claim 13, wherein the motor actuator and the cam mechanism are mounted together within the second outer plant pot interior volume.

15. The method of claim 13, further comprising the step of providing a rotating turntable disposed between follower magnet and the cam mechanism with a turntable shaft connected therethrough with the motor actuator for transmitting bi-directional movements using the cam follower and follower magnet magnetic attraction with the pivoting magnet plate for inner plant pot movements relative to the outer plant pot assembly, which causes a resulting animation of the inner plant pot.

16. The method of claim 13, wherein the motor actuator controls and instantiates rotational movement of the inner plant pot relative to the outer plant pot.

17. The method of claim 13, further comprising the step of providing an electronic processor control module that instantiates movement of the inner plant pot relative to the outer plant pot with the motor actuator.

18. A device for supporting and animating flowers or plants, comprising:
   an outer plant pot assembly comprising an outer pot upper housing and an outer pot lower housing, the outer pot upper housing defining a first outer plant pot interior volume and a waterproof interface, the outer pot lower housing defining a second outer plant pot interior volume with the waterproof interface disposed between the first outer plant pot interior volume and the second outer plant pot interior volume;
   an inner plant pot having an inner plant pot interior volume configured to house a plant therein with the inner plant pot received within the first outer plant pot interior volume, the inner plant pot having an underside thereof coupled with a pivoting magnet plate at the waterproof interface for inner plant pot displacement movements relative to the first outer plant pot interior volume and the waterproof interface, the outer pot lower housing defining a second outer plant pot interior volume;
   a single motor actuator within the second outer plant pot interior volume;
   a cam mechanism and cam follower disposed within the second outer plant pot interior volume, the cam mechanism actuated with the motor;
   a follower magnet mounted on the cam follower, the follower magnet being positioned below the pivoting magnet plate at the waterproof interface for magnetic attraction therebetween, with the follower magnet responsive to the cam follower from within the second outer plant pot interior volume such that the inner plant pot moves relative to the outer plant pot assembly; and
   an electronic processor control module that instantiates movement of the inner plant pot relative to the outer plant pot assembly with the single motor actuator with a plurality of sensors in communication with the electronic processor control module providing data collected by the plurality of sensors.

19. The device of claim 18, wherein at least one of the plurality of sensors comprises a capacitance sensor.

20. The device of claim 19, wherein the plurality of sensors comprise a soil probe, the capacitance sensor comprises a leaf of a plant, and a conductive circuit is completed when a user touches the leaf and the conductivity circuit is completed via the soil probe, which provides capacitance data that changes upon the user touching the plant.

* * * * *